June 1, 1965 P. L. GOMORY 3,186,805
CATALYTIC APPARATUS
Filed Nov. 6, 1961
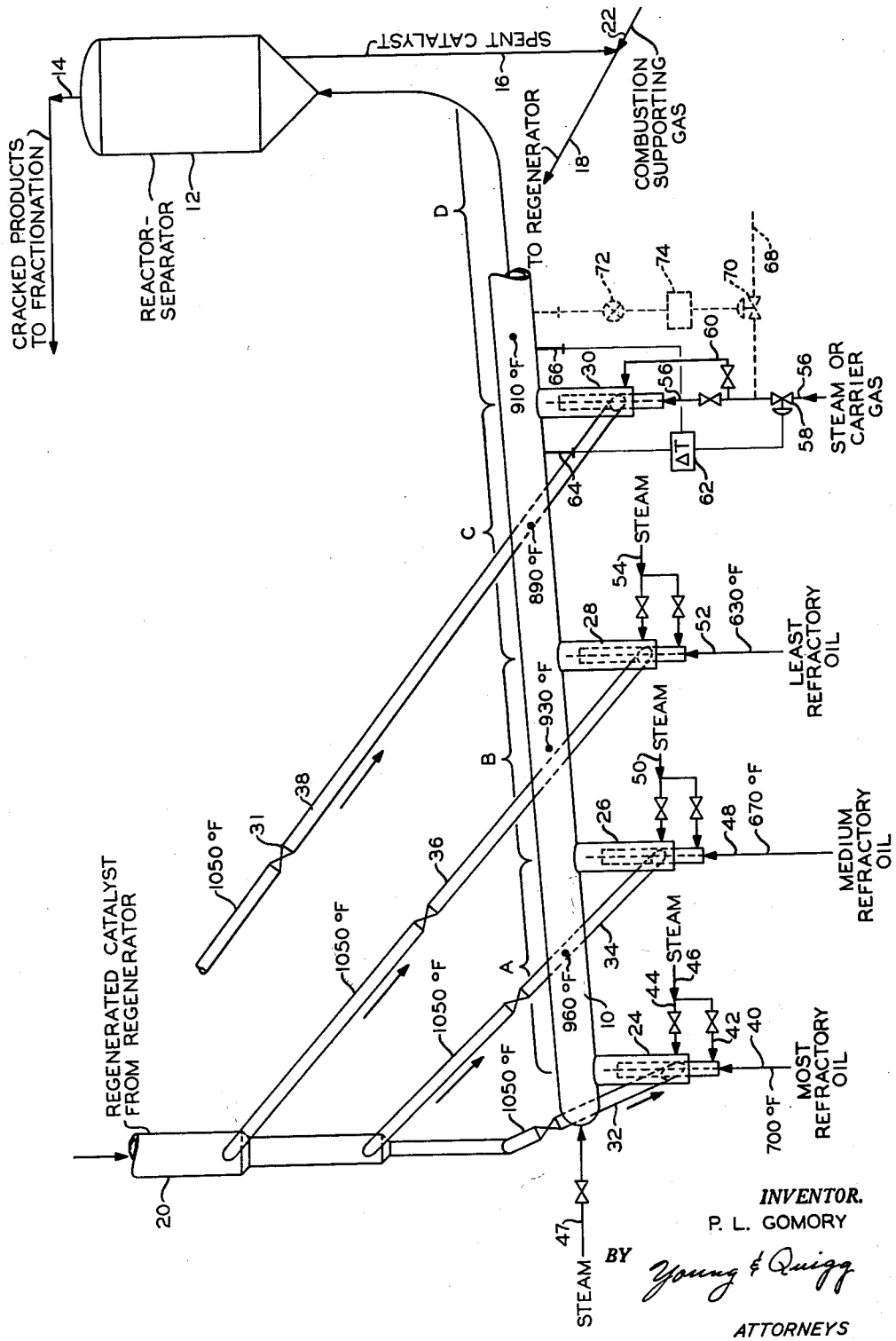
INVENTOR.
P. L. GOMORY
BY Young & Quigg
ATTORNEYS United States Patent Office 3,186,805
Patented June 1, 1965

3,186,805
CATALYTIC APPARATUS
Paul L. Gomory, Bethesda, Md., assignor to Phillips
Petroleum Company, a corporation of Delaware
Filed Nov. 6, 1961, Ser. No. 150,476
3 Claims. (Cl. 23—288)

This invention relates to an improved apparatus for effecting the catalytic conversion of a reactant feed utilizing a fluidized particulate suspension of catalyst.

The treatment of fluids to catalytically convert same to more valuable products utilizing fluidized catalyst technique is a well developed art. This technique which has been widely adopted by the petroleum industry for cracking heavier hydrocarbons to lighter hydrocarbons particularly suitable as motor and aviation fuels, comprises contacting a fluid feed and a particulate fluidized suspension of catalyst under reaction conditions so as to effect the desired reaction. In so-called fluid catalytic cracking, the hydrocarbon feed and catalyst are injected into an elongated riser in admixture with steam and/or other fluidizing gas, and the fluidized suspension is transported into the reactor for separation of catalyst and reaction product, as well as completion of the reaction. This technique leaves something to be desired in the way of control of the reaction since the most difficult to crack constituents of the feed are not the first to be cracked and are later contacted with catalyst which has already been partially spent and which is lower in temperature.

This invention is concerned with an improved process and apparatus for effecting better control of reaction conditions in fluidized catalytic conversion of reactants.

Accordingly, it is an object of the invention to provide an improved apparatus for catalytically converting a reactant feed in contact with a fluidized particulate catalyst. Another object is to provide an improved apparatus for cracking hydrocarbons utilizing the fluidized catalyst contacting technique. A further object is to effect better control of reaction conditions in fluidized catalytic conversion reactions, particularly, in cracking hydrocarbons, each of different gravity and refractoriness. It is also an object of the invention to effect better control of depth of cracking and uniformity of cracking of hydrocarbon feeds of varied characteristics. Other objects will become apparent upon consideration of the accompanying disclosure.

In accordance with a broad aspect of the invention, the reactant feed and particulate catalyst are introduced into one end of an elongated reaction zone and are caused to flow therethru under reaction conditions, the catalyst being fluidized therein, and introducing additional catalyst at a higher or lower temperature than ambient temperature in a substantial and effective amount to the reaction zone downstream of the feed injection point so as to continue the reaction. This technique of introducing catalyst after introducing all of the feed to the reaction zone and along the line of flow has the effect of raising or lowering the temperature of the section of the reaction zone just downstream of the injection point of added catalyst and provides contact of the feed with fresh catalyst to insure completion of the desired reaction. This aspect of the invention is applicable to either an exothermic or endothermic reaction. In case the reaction is exothermic, the added catalyst is cooler than the reaction ambient temperature of the admixture into which it is injected and the reverse is the case when the reaction is endothermic. The cracking of hydrocarbons is an endothermic reaction and a substantial amount of the heat required to maintain cracking conditions is supplied by the catalyst which is introduced to the reaction zone at a temperature substantially above the desired reaction temperature, the feed and steam being introduced at a somewhat lower temperature. The polymerization and alkylation of hydrocarbons are examples of exothermic reactions to which the invention applies.

In another embodiment of the invention the reactant feed and catalyst are introduced together at several points along the reaction zone and along the line of flow, the most refractory feed being introduced first and the least refractory being introduced last so that the most refractory feed is subjected to a higher temperature and a longer residence time in the reaction zone than the less refractory feeds. In this embodiment of the invention it is also desirable to inject fresh catalyst into the reaction zone downstream of the last point of introduction of feed so as to subject the uncracked or unreacted components of the stream to fresh catalyst at a temperature above the temperature of the stream into which the fresh catalyst is injected. This reactant feed-free catalyst injected downstream of the last feed injection might be termed "trim" catalyst since it "trims up" the reaction in the downstream end of the reaction zone.

A further embodiment of the invention comprises sensing the temperature just downstream of the point of introduction of the feed-free catalyst and controlling the amount or rate of introduction of trim catalyst so as to maintain a desired trim temperature in the downstream end of the reaction zone. It is preferred to measure temperature differential between points just upstream and just downstream of the trim catalyst injection point and then to control the amount or rate of injecting trim catalyst so as to maintain the desired temperature differential.

In the fluid catalytic cracking of hydrocarbons, it is known that different hydrocarbons require different catalyst-to-oil ratios and contact times for optimum conversion of the oils. More refractory materials (that is, stocks more difficultly cracked) require more severe conditions for cracking and less refractory materials require less severe conditions of operation.

A more complete understanding of the invention may be had by reference to the accompanying schematic drawing in which an elongated reactor 10 leads into the bottom of a reactor-separator 12 to form a continuous reaction zone. Reactor 12 is a conventional fluidized catalytic reactor having catalyst and product separation means whereby the effluent reaction products are passed thru line 14 to conventional recovery apparatus, such as fractionation equipment. Spent catalyst is recovered thru leg 16 which leads into return line 18 to a catalyst regenerator, not shown, but which stands on regenerated catalyst leg 20. Combustion supporting gas, such as air, is injected into line 18 thru line 22 to transport the spent catalyst to the regenerator and burn off the carbonaceous deposit thereon.

A series of feed and catalyst injection units designated 24, 26, 28, and 30 connect with the lower side of reactor-riser 10 along the line of flow at spaced intervals to provide successive and continuous reaction zones A, B, C, and D. Each injection unit, such as 24, is designed in accordance with the injection units of U.S. Patent 2,895,517 issued to K. A. Harper. Catalyst enters the annulus of 24 from leg 20 via inlet conduit 32. The amount of catalyst injected depends upon the amount of feed and fluidizing gas injected thru the unit. Slide valves 31 provide for cutting off catalyst flow when desired. Inlet conduits 34, 36, and 38 provide regenerated catalyst flow to their respective injection devices. Feed is injected to the bottom of device 24 thru line 40 and steam for fluidizing and aeration is injected thru lines 42 and 44 which connect with steam supply line 46. Device 26 is provided with a feed injection line 48 and with a steam injection system 50 corresponding to that of unit 24. Injection device 28 is provided with a similar feed injection line 52 and steam injection system 54.

Injection device 30 is provided with a steam or fluidizing gas supply line 56 in which is positioned a motor valve 58. A branch line 60 conducts steam as fluidizing gas into the annulus of unit 30 for aeration or fluidization of catalyst introduced thru inlet conduit 38. No reactant feed inlet is provided for unit 30 since all of the feed injected into the reaction zone is to be injected upstream of this point.

Control of the amount of catalyst or rate of injecting catalyst into the reaction zone from device 30 is effected by controller 62 which receives the sensed temperature thru lines 64 and 66 from points on either side of the injection point from device 30 and controls the amount of opening of motor valve 58 in response to the differential temperature between the sensing points. The amount of catalyst introduced thru 30 is dependent upon the amount of gas (steam) passed thru valve 58. The catalyst being hotter than the ambient into which it is passed, raises the temperature proportionately. It is also feasible to operate valve 58 in response to a sensed temperature within the reaction zone just downstream of injection device 30 or in Zone D.

The temperature in Zone D may also be controlled by an alternate method by injecting steam thru line 68 by controlling valve 70 in response to the temperature sensed in Zone D via transmitter 72 which emits a signal proportional to the sensed temperature to controller 74. This controller directly controls valve 70 and the rate of catalyst injection.

In accordance with a preferred mode of operation, the most refractory oil to be cracked is introduced into the upstream end of reactor 10 thru line 40 along with steam injected from supply line 46 and with catalyst from conduit 32. Steam is also injected when desired, thru line 47. Among the highly refractory oils are the aromatics, e.g. produced by solvent refining of at least a portion of light and/or heavy cycle oil and/or decant oil produced in the system; among the intermediate refractory oils are the light and/or heavy cycle oils, and/or decant oil (or slurry); and among the least refractory are the gas oils (paraffinic) and/or raffinates (paraffinic) produced, e.g., by solvent extraction of the above-referred to cycle oils and decant oil. Topped or reduced crude oils are the least refractory oils and can be included herein. Each of these oils is converted at its optimum conditions in the process of the invention. Two or more of these oils can be used in each single conversion zone.

Immediately upon suspension or entrainment of the fluidized catalyst in the vaporized hydrocarbon, cracking is initiated and continues as the fluidized catalyst and feed pass along reactor 10. The temperature of the catalyst, feed, and steam are regulated so as to produce the desired amount of cracking in Zone A and these temperatures and quantities of materials which determine the reaction temperature, are dependent upon the character of the feed to be cracked. Additional feed of a less refractory nature is introduced thru line 48 into reactor 26 along with hot catalyst from conduit 34 and steam from line 50. The fresh or regenerated catalyst cracks the less refractory feed and also continues the cracking of the residual more refractory feed introduced thru line 40. This cracking of both the feed from line 40 and line 48 is continued in Zone B.

Injection of the least refractory oil or hydrocarbon feed is effected thru ejector 28 with feed from line 52, catalyst from line 36 and steam from line 54. Cracking of feed from line 52 and further cracking of constituents already within the reaction zone is continued in Zone C.

In order to trim up the cracking reaction, injection of trim catalyst from conduit 38 is effected thru injector 30 into which steam or other suitable carrier gas is injected thru lines 56 and 60. The amount of catalyst injected at this point is controlled either to maintain a suitable differential temperature between Zones C and D or to maintain a suitable trim temperature in Zone D, depending upon the character of the feeds and the extent of cracking desired.

For example, an aromatic oil is charged as the most refractory oil, which can at least in part be recovered from the catalytic cracking effluent product, as feed in line 40. Herein the hottest catalyst contacts the most difficult to crack oil and, of course, will have the longest residence time in the riser. Components from this aromatic feed (converted products as well as unconverted products) and cracking catalyst have added thereto the oil of line 48 of medium refractoriness along with additional regenerated catalyst. This second oil, for example one of the cycle oils produced in the system, is reacted or cracked under less severe conditions. Total product of cracking from oils from lines 40 and 48, along with any unconverted portions and the catalyst has added there the least refractory oil from line 52, e.g., virgin gas oil, as well as another portion of regenerated catalyst. And finally, as shown in the drawing, a main feature of the invention comprises adding additional regenerated catalyst thru unit 30 to this entire mass to trim-up the final cracking to further convert unconverted oils from the three feeds.

It can be readily seen that the most aromatic oil 40 has the longest contact time, and the least refractory 52 has the shortest contact time, which is desired.

In order to illustrate the invention, operating conditions and results obtained in cracking specific oil feeds are set forth below:

Zone A

| | |
|---|---|
| Catalyst to oil weight ratio | 8:1 |
| Temperature, ° F., Zone A | 960 |
| Oil feed (12): | |
|   Heavy cycle oil: | |
|     Pounds/hr. | 38,000 |
|     ° API, 60° F./60° F. | 25.0 |
|     Aniline number | 140 |
|     Temperature, ° F. | 700 |
| Catalyst (silica-alumina) (10): | |
|   Temperature, ° F. | 1050 |
|   Tons/hr. | 152 |
| Steam (13): | |
|   Temperature, ° F. | 360 |
|   Pounds/hr. | 400 |
| Steam (14): | |
|   Temperature, ° F. | 360 |
|   Pounds/hr. | 1200 |

Zone B

| | |
|---|---|
| Total catalyst to total oil weight ratio | 6–7:1 |
| Temperature, ° F., Zone B | 930 |
| Oil feed (17): | |
|   Light virgin gas oil: | |
|     Pounds/hr. | 38,000 |
|     ° API, 60° F./60° F. | 34.0 |
|     Aniline number | 170 |
|     Temperature, ° F. | 670 |
| Catalyst (same type) (16): | |
|   Temperature, ° F. | 1050 |
|   Tons/hr. | 102.6 |
| Steam (18): | |
|   Temperature, ° F. | 360 |
|   Pounds/hr. | 350 |
| Steam (19): | |
|   Temperature, ° F. | 360 |
|   Pounds/hr. | 1000 |

Zone C

| | |
|---|---|
| Total catalyst to total oil weight ratio | 5.5:1 |
| Temperature, °F., Zone C | 890 |
| Oil feed (21): | |
|   Heavy virgin gas oil: | |
|     Pounds/hr. | 38,000 |
|     °API, 60°F./60°F. | 26.0 |
|     Aniline number, °F. | 180 |
|     Temperature, °F. | 630 |
| Catalyst (same type) (20): | |
|   Temperature, °F. | 1050 |
|   Tons/hr. | 58.9 |
| Steam (22): | |
|   Temperature, °F. | 360 |
|   Pounds/hr. | 300 |
| Steam (23): | |
|   Temperature, °F. | 360 |
|   Pounds/hr. | 800 |

Zone D

| | |
|---|---|
| Total catalyst to oil weight ratio | 6:1 |
| Temperature, °F., Zone D | 910 |
| Catalyst (same type) (24): | |
|   Temperature, °F. | 1050 |
|   Tons/hr. | 28.5 |
| Steam (26): | |
|   Temperature, °F. | 360 |
|   Pounds/hr. | 270 |
| Steam (27): | |
|   Temperature, °F. | 360 |
|   Pounds/hr. | 700 |
| Steam (25): | |
|   Temperature, °F. | 360 |
|   Pounds/hr. | 2000 |
| Total percent conversion at reaction vessel: | |
|   Heavy cycle oil (12) _____percent | 50 |
|   Light virgin gas oil (17) _____do | 55 |
|   Heavy virgin gas oil (21) _____do | 60 |
| Without addition of catalyst in Zone D, conversions obtained are: | |
|   Heavy cyclo oil (12) _____percent | 47 |
|   Light virgin gas oil (17) _____do | 52 |
|   Heavy virgin gas oil (21) _____do | 57 |

The foregoing data are merely illustrative of the invention and should not be construed as unnecessarily limiting the same. The invention does not lie in the specific reaction conditions but rather in the technique of operation involving injecting catalyst and reactant into the reactor at spaced points along the line of flow and in injecting trim catalyst downstream of the last feed injection point so as to trim up the reaction or control the degree or depth of cracking. Optimum cracking conditions for various types of feeds are well known, since the hydrocarbon cracking art is highly developed, particularly, in the fluidized cracking art which has come into such wide use in recent years. Catalyst and feed injection devices other than the unit illustrated in the drawing may be used, which may require associated steam injection means.

It will be noted that the flexibility achieved by the operation of the present invention includes proportioning the amount of fresh catalyst and added oil or reactant at each point of oil or reactant addition. Furthermore, the addition of the "trim" catalyst permits greater flexibility at any or each point of reactant and catalyst addition than would be possible without said "trim" catalyst, although flexibility of operation even without said "trim" catalyst is made evident in this disclosure. Furthermore, the detecting of the temperature change across the locus of introduction of the "trim" catalyst and the supply of the "trim" catalyst at a temperature and/or at an amount responsive to said temperature change or difference permits a control of an empirical nature not heretofore available in catalytic operations to which the invention is related or to which it can be applied. Thus, according to a basic concept of the invention there is provided a combination in which with only one oil or reactant injection or feed there is a control supply of additional catalyst, the control being based upon the character and extent of reaction caused in a predetermined time or length of flow by the additional catalyst which has been added. It is within the scope of the invention to inject the additional catalyst at one or more points, regardless of the number of oil injections, one being sufficient for the concept here set forth. Several streams of oil and catalyst can be added and, indeed, with each oil stream addition, or thereafter, the amount or amounts of catalysts can be determined and controlled by measuring at least one temperature downstream of any said addition of catalyst. In a preferred form a temperature differential is used, the differential being that existing between the temperature of the oil and catalyst mixture just before the addition of additional oil and catalyst and the temperature of the combined oil and catalyst and additional oil and additional catalyst a split second or so downstream of the addition of the additional oil and additional catalyst.

The invention herein set forth in one aspect thereof permits introduction of catalyst in varying amounts at different times at the same place and at different places into the reaction zone all the while and even after oil or reactant has been introduced or added.

In the feed and catalyst injection units 24, 26, and 28, or any of them, it is within the scope of the claimed invention to bring together near a locus at which these will be introduced the catalyst and oil or reactant, and steam or other fluid, in a desired ratio for a relatively short time, compared with the time the catalyst and oil will be together in the process. Thus, there can be a desirable prereaction and/or preconditioning of the injected reactant and/or catalyst. Yet the total volume of catalyst, steam, or other fluid and oil or other reactant added to the reaction zone, which contains already earlier introduced materials, as described can be fed at any desired ratio to the mass of materials already in said zone.

Respecting the injection of additional catalyst in a case in which the reaction mass flowing at a given point is too hot to suitably treat additional reactant it is within the scope of the invention to introduce catalyst at a temperature sufficiently low that it will cool the mass upon admixture therewith. The flexibility of operations possible within the scope of this disclosure will be evident to one skilled in the art in possession of this disclosure.

Certain modifications of the invention will become apparent to those skilled in the art and the illustrative details disclosed are not to be construed as imposing unnecessary limitations on the invention.

I claim:

1. Apparatus comprising in combination an elongated tubular reactor free of obstructions so as to permit flow of solids and gases longitudinally therethru; means for forming a suspension of particulate catalyst in a first fluid reactant outside of said reactor and introducing said suspension to the upstream end of said reactor; at least one additional similar means for forming a suspension of said particulate catalyst in a fluid reactant outside of said reactor and introducing said suspension to said reactor downstream of the first suspension; separate catalyst introduction means downstream of the last means for introducing suspended catalyst and feed for injecting a stream of feed-free solid particulate catalyst to said reactor; an outlet for catalyst and reaction effluent in the downstream end of said reactor as the sole outlet from said reactor; means for separating catalyst and reaction effluent gases connected with said outlet; and separate means for withdrawing fluid product and catalyst from the separating means.

2. The apparatus of claim 1 including means for sensing differential temperature in said reactor between a point intermediate the last two introduction means and a point downstream of said separate introduction means and regulating the rate of introducing catalyst thru said separate means in response thereto to maintain a selected differential temperature between the two points.

3. The apparatus of claim 1 including means for sensing the temperature within said reactor downstream of said separate catalyst introduction means; and means for regulating the rate of introducing catalyst to said reactor thru said separate introduction means in response to the sensed temperature to maintain a selected temperature adjacent the sensing point.

References Cited by the Examiner
UNITED STATES PATENTS

| | | | |
|---|---|---|---|
| 2,518,474 | 8/50 | Hudson | 208—74 |
| 2,731,508 | 1/56 | Jahnig et al. | 208—155 |
| 2,766,185 | 10/56 | Pansing | 208—155 |
| 2,908,630 | 10/59 | Friedman | 208—153 |

ALPHONSO D. SULLIVAN, *Primary Examiner.*

DANIEL E. WYMAN, *Examiner.*